United States Patent [19]

Ward

[11] Patent Number: 4,686,030

[45] Date of Patent: Aug. 11, 1987

[54] MILD HYDROCRACKING WITH A CATALYST HAVING A NARROW PORE SIZE DISTRIBUTION

[75] Inventor: John W. Ward, Yorba Linda, Calif.

[73] Assignee: Union Oil Company of California, Los Angeles, Calif.

[21] Appl. No.: 856,817

[22] Filed: Apr. 28, 1986

[51] Int. Cl.$^4$ ............................................. C10G 45/08
[52] U.S. Cl. .............................. 208/216 PP; 208/111; 208/112; 208/254 H
[58] Field of Search ................. 208/111, 112, 216 PP, 208/254 H

[56] References Cited

U.S. PATENT DOCUMENTS

| | | | |
|---|---|---|---|
| 3,471,399 | 10/1969 | O'Hara et al. | 208/216 R |
| 3,509,044 | 4/1970 | Adams et al. | 208/216 R |
| 3,770,618 | 11/1973 | Adams et al. | 208/216 R |
| 4,006,076 | 2/1977 | Christensen et al. | 208/211 |
| 4,048,060 | 9/1977 | Riley | 208/210 |
| 4,297,242 | 10/1981 | Hensley, Jr. et al. | 502/322 |
| 4,298,458 | 11/1981 | Banta et al. | 208/112 |
| 4,500,424 | 2/1985 | Simpson et al. | 208/216 PP |
| 4,540,483 | 9/1985 | Simpson et al. | 208/216 PP |
| 4,568,655 | 2/1986 | Oleck et al. | 208/216 PP |
| 4,581,126 | 4/1986 | Day et al. | 208/112 |

Primary Examiner—Andrew H. Metz
Assistant Examiner—Anthony McFarlane
Attorney, Agent, or Firm—Dean Sandford; Gregory F. Wirzbicki; Alan H. Thompson

[57] ABSTRACT

Mild hydrocracking is accomplished with a catalyst containing one or more hydrogenation metals supported on an amorphous porous refractory oxide having a narrow pore size distribution and a small mode pore diameter.

20 Claims, No Drawings

MILD HYDROCRACKING WITH A CATALYST HAVING A NARROW PORE SIZE DISTRIBUTION

BACKGROUND OF THE INVENTION

The invention relates to a process for mild hydrocracking hydrocarbon oils. More particularly, the invention relates to a mild hydrocracking catalytic process for treating vacuum gas oils and residuum hydrocarbon feedstocks.

In the refining of hydrocarbon oils, it is often desirable to subject the hydrocarbon oil to catalytic hydroprocessing. One such process is hydrocracking, a process wherein, in the typical instance, a gas oil or residuum feedstock is passed with hydrogen through a bed of catalyst active for cracking relatively high molecular weight compounds to more desirable, relatively low molecular weight compounds of lower boiling point. In addition, because the catalyst has hydrogenation activity, the cracked products are saturated by hydrogenation while organosulfur and organonitrogen compounds in the feed are converted to hydrogen sulfide and ammonia, respectively, both of which are usually removed in gas-liquid separators. Thus, the advantage of hydrocracking lies in the conversion of a sulfur-containing and/or nitrogen-containing gas oil feed, boiling, for example, mostly above about 700° F., to a relatively sulfur and nitrogen-free product of boiling point below 700° F., such as gasoline, jet fuel, diesel fuel, and mixtures thereof.

Recently, attention has been directed to "mild hydrocracking." The cost of constructing a hydrocracking unit operating at high pressures is quite significant and poses a major economic obstacle to its use. Accordingly, interest has developed in converting existing hydroprocessing units, such as hydrotreating or hydrodesulfurization units, into hydrocracking units. It is realized, of course, that hydrotreating units and the like, especially once-through units, are not normally designed for optimum hydrocracking conditions, and specifically, for the high pressures usually employed in commercial hydrocracking, i.e., above 1,500 p.s.i.g. Nevertheless, there is still an advantage if even some hydrocracking can be achieved under the low pressure constraints of typical hydrotreating or hydrodesulfurization units, and the challenge to the art is to discover hydrocracking catalysts having sufficient activity and activity maintenance to be commercially useful under such mild hydrocracking conditions.

Therefore, an aim of the art is to provide a mild hydrocracking catalyst having a high activity, selectivity and stability. Activity may be determined by comparing the temperature at which various catalysts must be utilized under otherwise constant mild hydrocracking conditions with the same feedstock so as to produce a given percentage (usually between 70 and 50 volume percent) of products boiling at or below 700° F. The lower the temperature for a given catalyst, the more active such a catalyst is for mild hydrocracking. Alternatively, activity may be determined by comparing the percentages of products boiling at or below 700° F. when various catalysts are utilized under otherwise constant mild hydrocracking conditions with the same feedstock. The higher the percentage of 700° F.- minus product converted from the components in the feedstock boiling above 700° F. for a given catalyst, the more active such a catalyst is in relation to a catalyst yielding a lower percentage of 700° F.- minus product. Selectivity of a mild hydrocracking catalyst may be determined during the foregoing described activity test and is measured as that percentage fraction of the 700° F.-minus product boiling in the range of middle distillate or midbarrel products, i.e., 300° F.-700° F. Stability is a measure of how well a catalyst maintains its activity over an extended time period when treating a given hydrocarbon feedstock under the conditions of the activity test. Stability is generally measured in terms of the change in temperature required per day to maintain a 40 volume percent or other given conversion (usually less than 50 volume percent).

SUMMARY OF THE INVENTION

The invention provides a mild hydrocracking process using a catalyst containing at least one active hydrogenation metal component supported on an amorphous porous refractory oxide wherein the catalyst has a narrow pore size distribution including at least 75 percent of the total pore volume in pores of diameter from about 50 to about 130 angstroms. Preferably, the catalyst has at least about 60 percent of the pore volume in pores of diameter within about 20 angstroms above or below a mode pore diameter in the range from about 55 to about 100 angstroms. In one embodiment, a vacuum gas hydrocarbon oil is mildly hydrocracked, with simultaneous desulfurization and denitrogenation, by contact with the catalyst under mild hydrocracking conditions correlated so as to convert about 10 to about 50 volume percent of the oil fraction boiling above 700° F. to hydrocarbon products boiling at or below about 700° F. In other embodiments, the hydrocarbon oil may be desulfurized and denitrogenated either prior to or following the mild hydrocracking.

The most preferred amorphous refractory oxide for use in the invention comprises gamma alumina or a similarly active alumina. One of the most important discoveries in the invention is that gamma alumina and related materials having a relatively small mode pore diameter and a narrow pore size distribution are useful under the relatively unfavorable conditions of mild hydrocracking of gas oils to lower boiling distillates.

DETAILED DESCRIPTION OF THE INVENTION

The invention is directed to a mild hydrocracking process using a catalyst comprising one or more active hydrogenation metals or compounds thereof on a porous amorphous refractory oxide. The catalyst has a narrow pore size distribution wherein at least about 75 percent of the total pore volume of the catalyst is in pores of diameter from about 50 to about 130 angstroms, and preferably at least about 60 percent of the total pore volume is in pores of diameter within about 20 angstroms above or below the mode pore diameter of the catalyst, as measured by mercury porosimetry.

In a preferred embodiment for hydrodesulfurization, hydrodenitrogenation, and mild hydrocracking, a catalyst containing an amorphous refractory oxide, such as alumina, has an average pore diameter from about 50 to about 110 angstroms, preferably about 55 to about 100 angstroms, and most preferably about 60 to about 90 angstroms. The catalyst has a narrow pore size distribution wherein at least about 50 percent, preferably at least about 65 percent, and more preferably at least about 75 percent is in pores distributed over a narrow range of about 20 angstroms above to about 20 angstroms below the mode pore diameter.

In the preparation of the catalysts of the present invention, the pore size distribution of the amorphous support particles may be similar to that of the final catalyst, but such is not necessary or critical. The amorphous refractory oxide support material is typically comprised of such amorphous inorganic refractory oxides as silica, magnesia, silica-magnesia, zirconia, silica-zirconia, titania, silica-titania, alumina, silica-alumina, etc. with supports containing gamma, theta, delta and/or eta alumina being highly preferred. Preferred support particles having the preferred physical characteristics disclosed herein are commercially available from Nippon-Ketjen Catalyst Division of AKZO-Chemie, and American Cyanamid, Inc. Mixtures of the foregoing oxides are also contemplated, especially when prepared as homogeneously as possible.

The amorphous refractory oxide support material is usually prepared in the form of shaped particulates, with the preferred method being to extrude a precursor of the desired support through a die having openings therein of desired size and shape, after which the extruded matter is cut into extrudates of desired length. The support particles may also be prepared by mulling (or pulverizing) a precalcined amorphous refractory oxide to a particle size less than about 100 microns and extruding the material.

The extruded particles may have any cross-sectional shape, i.e., symmetrical or asymmetrical, but most often have a symmetrical cross-sectional shape, preferably a cylindrical or polylobal shape. The cross-sectional diameter of the particles is usually about 1/40 to about ⅛ inch, preferably about 1/32 to about 1/12 inch, and most preferably about 1/24 to about 1/15 inch. Among the preferred catalyst configurations are cross-sectional shapes resembling that of a three-leaf clover, as shown, for example, in FIGS. 8 and 8A of U.S. Pat. No. 4,028,227. Preferred clover-shaped particulates are such that each "leaf" of the cross-section is defined by about a 270° arc of a circle having a diameter between about 0.02 and 0.05 inch. Other preferred particulates are those having quadralobal cross-sectional shapes, including asymmetrical shapes, and symmetrical shapes such as in FIG. 10 of U.S. Pat. No. 4,028,227. Other particulates are available from Davison Chemical Company, a division of W. R. Grace & Company, having ring and minilith shapes, as disclosed in U.S. Pat. No. 4,510,261.

Typical characteristics of the amorphous refractory oxide supports utilized herein are a total pore volume, mode pore diameter and surface area large enough to provide substantial space and area to deposit the active metal components. The total pore volume of the support, as measured by conventional mercury porosimeter methods, is usually about 0.2 to about 2.0 cc/gram, preferably about 0.25 to about 1.0 cc/gram, and most preferably about 0.3 to about 0.9 cc/gram. Surface area (as measured by the B.E.T. method) is typically above about 100 m²/gram, and preferably about 125 m²/gram to about 400 m²/gm. Physical characteristics of three amorphous refractory oxide supports utilized in preparation of catalyst employed in the process of the invention are summarized in Table A as follows:

TABLE A

| Pore Diameter Angstroms | Support X % Pore Volume | Support Y % Pore Volume | Support Z % Pore Volume |
| --- | --- | --- | --- |
| 40–50 | — | — | 4.0% |
| <50 | 0.8% | — | — |
| 50–60 | 5.7% | 4.0% | 16.0% |
| 60–70 | 16.4% | 15.0% | 46.0% |
| 70–80 | 29.9% | 61.0% | 28.0% |
| >80 | — | — | 6.0% |
| 80–90 | 24.6% | 13.0% | — |
| >90 | — | 7.0% | — |
| 90–100 | 9.8% | — | — |
| 100–110 | 6.6% | — | — |
| 110–120 | 1.6% | — | — |
| 120–130 | 0.8 | — | — |
| >130 | 5.7% | — | — |
| PORE VOLUME cc/gram (Merc. Poros.) | 0.61 | 0.63 | 0.58 |
| MODE PORE DIAMETER (Merc. Poros.) | ~88 | ~76 | ~67 |

To prepare the mild hydrocracking catlayst, the support material is compounded, as by a single impregnation or multiple impregnations of a calcined amorphous refractory oxide support particles, with one or more precursors of at least one catalytically active hydrogenation metal component. The impregnation may be accomplished by any method known in the art, as for example, by spray impregnation wherein a solution containing the metal precursors in dissolved form is sprayed onto the support particles. Another method is the circulation or multi-dip procedure wherein the support material is repeatedly contacted with the impregnating solution with or without intermittent drying. Yet another method involves soaking the support in a large volume of the impregnation solution, and yet one more method is the pore volume or pore saturation technique wherein support particles are introduced into an impregnation solution of volume just sufficient to fill the pores of the support. On occasion, the pore saturation technique may be modified so as to utilize an impregnation solution having a volume between 10 percent less and 10 percent more than that which will just fill the pores.

If the active metal precursors are incorporated by impregnation, a subsequent or second calcination, as for example at temperatures between 750° F. and 1400° F., converts the metals to their respective oxide forms. In some cases, calcinations may follow each impregnation of individual active metals. Such multiple impregnation-calcination procedures, however, may be avoided in alternative embodiments of the invention, as for example, by comulling all the active metals with the support materials rather than impregnating the metals thereon. In comulling, precursors of the support materials usually in a hydrated or gel form, are admixed with precursors of the active metal components, either in solid form or in solution, to produce a paste suitable for shaping by known methods, e.g., pelleting, extrusion, etc. A subsequent calcination yields a mild hydrocracking catalyst containing the active metals in their respective oxide forms.

When the mild hydrocracking catalyst is prepared by the foregoing or equivalent methods, at least one active metal component having hydrogenation activity, typically one or more metal components from the Group VIB and VIII metals of the Periodic Table of Elements, is introduced into the catalyst. Preferably, the catalyst contains both a Group VIB and VIII element as hydrogenation metals, with cobalt or nickel and molybdenum or tungsten being the preferred combination of active metals, and nickel and tungsten being most preferred. The catalyst contains up to about 10, usually from 1 to 8 percent, and preferably from 2 to 6 percent cent by weight of the Group VIII metal, calculated as the monoxide, and up to about 30, usually from about 3 to about 28 percent, and preferably from 8 to 26 percent by weight of the Group VIB metal, calculated as the trioxide. A highly preferred catalyst useful herein contains about 17 to about 27 weight percent of Group VIB metal components, calculated as the trioxide, and from about 0.5 to about 8 weight percent of Group VIII metal components, calculated as the monoxide. (Note: if molybdenum is selected as the active metal, it generally is solubilized with phosphoric acid, ammonium hydroxide, citric acid, and the like, during the preparation of the catalyst. Therefore, molybdenum-containing catalysts will often further contain a phosphorus component on the catalyst, which phosphorus component may provide acid properties to the catalyst or act as a catalytic promoter. Typically the catalyst contains about 1 to about 6 weight percent of phosphorus components, calculated as P.)

The physical characteristics of the mild hydrocracking catalyst will usually vary from those of the support particles by less than about 25 percent. Ordinarily, the mild hydrocracking catalyst is prepared so as to have a narrow pore size distribution wherein at least about 75 percent, preferably at least about 80 percent, and most preferably at least about 85 percent of the total pore volume is in pores of diameter from about 50 to about 130 angstroms. Ordinarily the catalyst has less than about 10 percent of the total pore volume in pores of diameter below about 50 angstroms and preferably less than about 0.05 cc/gram. Also, the catalyst has less than about 10 percent of the pore volume in pores of diameter greater than about 130 angstroms, preferably less than about 0.05 cc/gram.

Another porosity feature of the catalyst is the narrow pore size distribution of the pores of diameter greater than the mode pore diameter. The mode pore diameter of the catalyst usually lies in the range from about 50 to and most preferably about 60 to about 90 angstroms. Ordinarily, at least about 40 percent of the total pore is in pores of diameter between the mode pore diameter and less than about 90 angstroms, preferably less than about 50 angstroms, and most preferably less than about 25 angstroms above the mode pore diameter. With respect to small pores, at least about 40 percent of the total pore volume is in pores of diameter between the mode pore diameter and less than about 50, and preferably less than about 25 angstroms below the mode pore diameter.

Generally, the supports and catalysts employed in the process of the invention have steeper-sloped pore size distribution curves than the curves of conventional mild hydrocracking catalysts. As used herein, a steeper slope is a negative slope of greater absolute value than the absolute value of the negative slope of a comparative support or catalyst. The slope, as defined herein, of a pore size distribution curve, derived, for example, from mercury porosimeter testing techniques, [plotting cumulative pore volume (ordinate) vs. pore diameter (logarithmic scale abscissal)], is for a line drawn through a point on the curve representing 40 percent of the total pore volume in pores of diameter above the mode pore diameter and through a point on the curve representing 40 percent of the total pore volume in pores of diameter below the mode pore diameter. More preferably, the support and catalyst used in the process of the invention have steeper slopes than respective conventional supports and catalysts for a line drawn through a point on the curve representing the mode pore diameter and through a point on the curve representing 40 percent of the total pore volume in pores of diameter greater than the mode pore diameter.

Other physical properties of the final mild hydrocracking catalyst typically include a total pore volume of about 0.20 to about 1.0 cc/gram, and preferably about 0.20 to about 0.60 cc/gram and most preferably about 0.25 to about 0.5 cc/gram and a surface area greater than about 100m$^2$/gram, and preferably between about 100 and 250 m$^2$/gram with both properties determined by the conventional methods previously disclosed herein.

One preferred catalyst employed in the invention contains about 1 to about 6 weight percent of Group VIII metal components, calculated as the monoxide, from about 17 to about 35 weight percent of Group VIB metal components, calculated as the trioxide, and about 1 to about 6 weight percent of phosphorus components, calculated as P, on a porous refractory oxide support consisting essentially of gamma alumina. The most preferred Group VIII and Group VIB metals in this embodiment are cobalt and molybdenum, respectively. Physical characteristics of this catalyst include a total pore volume of about 0.30 to about 0.50 cc/gram, a surface area from about 125 to about 225 m$^2$/gram and a mode pore diameter from about 80 to about 110 angstroms.

A highly preferred catalyst employed in the invention contains about 1 to about 6 weight percent of nickel component, calculated as NiO, from about 17 to about 30 weight percent of molybdenum components, calculated as MoO3, and about 1 to about 6 weight percent of phosphorus components, calculated as P, on a support containing gamma alumina. This catalyst has a surface area from about 125 m$^2$/gram to about 250m$^2$/gram, a mode pore diameter from about 60 to about 90 angstroms, and a pore size distribution wherein at least about 70 percent of the pore volume is in pores of diameter in the range from about 20 angstroms above to about 20 angstroms below the mode pore diameter.

Catalysts are activated in accordance with methods suited to a mild hydrocracking process. Most of the catalysts used in the mild hydrocracking process of the invention are more active, sometimes even far more active, in a sulfided form than in the oxide form in which they are generally prepared. Accordingly, the catalyst used herein may be sulfided prior to use by any known method (in which case the procedure is termed "presulfiding"), for example, by passing a sulfiding agent over the catalyst prepared in the calcined form. Temperatures between 300° and 700° F. and gaseous space velocities between about 140 and 500 v/v/hr are generally employed, and this treatment is usually continued for at least about two hours. A mixture of hydrogen and one or more components selected from the group consisting of sulfur vapor and sulfur compounds (e.g., lower molecular weight thiols, organic sulfides, and especially H$_2$S) is suitable for presulfiding. Generally speaking, the relative proportion of sulfiding compounds in the presulfiding mixture is not critical, with any proportion of sulfur ranging between 0.01 and 15 percent by volume, calculated as S, being adequate. Also, liquid sulfiding agents, such as dimethyl disulfide and the like, may be used for presulfiding.

If the catalyst is to be used in a sulfided form, it is preferred that a presulfiding procedure be employed. However, since mild hydrocracking can be employed to upgrade sulfur-containing hydrocarbons (i.e., hydrodesulfurization), one may, as an alternative, accomplish the sulfiding in situ with sulfur-containing hydrocarbon oils, particularly those containing about 1.0 weight percent or more of sulfur, under mild hydrocracking conditions.

The mild hydrocracking catalyst may be employed as either a fixed, slurried or fluidized bed (but most usually a fixed bed) of particulates in a suitable reactor vessel wherein the hydrocarbon oil to be treated is introduced and subjected to mild hydrocracking conditions including an elevated total pressure, temperature, and hydrogen partial pressure. Under such conditions, the hydrocarbon oil and catalyst are subjected to a hydrogen partial pressure usually less than 1,500 p.s.i.g. (frequently less than about 1,200 p.s.i.g. for vacuum gas oil mild hydrocracking) at a space velocity usually less than 3.0 LHSV so as to effect the desired degree of hydrocracking, desulfurization denitrogenation. As used herein, "mild hydrocracking" requires the conversion of about 10 to about 50 volume percent of the feedstock hydrocarbons boiling above about 700° F. to products boiling at or below 700° F. from a single pass of the feedstock. Preferably, mild hydrocracking conditions are such that at least a 15 volume percent conversion is obtained, and usually no more than a 35 volume percent conversion is obtained.

Contemplated for treatment by the process of the invention are relatively high boiling hydrocarbon-containing oils including crude petroleum oils and synthetic crudes. Among the typical oils contemplated are top crudes, vacuum and atmospheric residual fractions, light and heavy atmospheric and vacuum distillate oils, deasphalted oils, shale oils, and oils from bituminous sands, coal compositions and the like. For use herein, typical hydrocarbon oils, or mixtures thereof, contain at least about 50 volume percent of components normally boiling above about 700° F. and in some cases, at least 90 volume percent. Also, useful oils may contain up to about 30 volume percent of components boiling above about 1,050° F.

Generally, a substantial portion (i.e., at least about 90 volume percent) of hydrocarbon feeds such as gas oils and the like boil at a temperature less than about 1100° F., preferably less than about 1050° F., and usually boil entirely within the range of about 100° F. to about 1100° F., and most frequently in the range from about 500° F. to about 1100° F.

Although virtually any high boiling hydrocarbon feedstock may be treated by mild hydrocracking, the process is particularly suited to treating (1) gas oils, preferably light and heavy vacuum gas oils and waxy shale oils, and (2) heavy residual fractions, especially the treated atmospheric and vacuum residuum oils containing less than about 25 ppmw, and preferably less than 5 ppmw of contaminant metals (vanadium, nickel, and the like). Sulfur is usually present in such oils in a proportion exceeding 0.1 weight percent and often exceeding 1.0 weight percent. Frequently, the feedstock contains undesirable proportions of nitrogen, usually in a concentration greater than about 0.01 weight percent and often between about 0.01 and 1.0 weight percent. The feedstock may contain waxy components, e.g., n-paraffins and slightly-branched paraffins, and thus have a high pour point, e.g., at least about 30° F.

A hydroprocessing reactor useful in the mild hydrocracking process of the invention is either a newly constructed, existing or modified existing reactor. Ordinarily an existing reactor that is part of an existing hydroprocessing unit, or units, in a refinery is utilized. A preferred reactor is one formerly used for vacuum gas oil desulfurization. In the mild hydrocracking of such a gas oil, the catalyst is usually maintained as a fixed bed with the feedstock passing downwardly once therethrough, and the reactor is generally operated under conditions within the limits of the existing reactor design. In some instances, mild hydrocracking reactors may be added to the existing equipment, either in series or parallel. If the feedstock is unusually high in organonitrogen and organosulfur compounds, it may be pretreated, integrally or separately, using a hydrotreating catalyst.

Typical mild hydrocracking conditions that yield more than about 10 volume percent conversion of the oil fraction boiling above 700° F. to liquid products boiling at or below 700° F. are shown in the following Table I:

TABLE I

| Operating Conditions | Preferred Range | Suitable Range |
|---|---|---|
| Temperature, °F. | 500–900 | 600–850 |
| Hydrogen Pressure, p.s.i.g. | 200–1,500 | 500–1,300 |
| Space Velocity, LHSV | 0.05–3.0 | 0.1–1.5 |
| Hydrogen Recycle Rate, scf/bbl | 500–15,000 | 1000–10,000 |

Generally, the hydrogen partial pressure maintained during hydrocracking is more than 50 percent of the total pressure. Usually, for once-through operation, the hydrogen partial pressure is between about 85 and 95 percent of the total pressure while, for recycle operation, the hydrogen partial pressure is somewhat lower, i.e., between 80 and 85 percent of the total pressure.

Another preferred reactor utilized in the process of the invention is a hydrodesulfurization reactor formerly used for processing a hydrocarbon residuum feedstock. Ordinarily this reactor is in the latter stage, or stages, of a multi-stage unit for hydrodesulfurization and/or demetallization of a residuum-containing feedstock. In the case of mild hydrocracking a residuum feedstock, the hydrogen partial pressure is usually higher than that during mild hydrocracking a gas oil. In comparison to conventional hydrodesulfurization conditions that yield, from a single pass, a conversion of less than about 10 volume percent of liquid hydrocarbon products boiling at or below 700° F., the operating conditions of the process of the invention for mild hydrocracking a residuum hydrocarbon typically include an increased temperature and/or decreased space velocity, correlated to effect a conversion greater than 10 percent.

The mild hydrocracking process of the invention may include either serial or simultaneous desulfurization and denitrogenation of a feedstock. Simultaneous desulfurization, denitrogenation and mild hydrocracking, as used herein, involves contacting a hydrocarbon oil feedstock with the particulate catalyst disclosed herein under conditions effecting (1) a lower sulfur and nitrogen content in the effluent and (2) a higher percentage of liquid products boiling at or below 700° F. in the effluent as compared to the feedstock. Serial desulfurization and denitrogenation of a feedstock involves either removing sulfur and nitrogen from the feedstock prior to contact of the mild hydrocracking catalyst disclosed herein or removing sulfur and nitrogen from the effluent of such a mild hydrocracking process.

The results obtained in any particular mild hydrocracking process will depend upon the nature of the catalyst, the nature of the feedstock, and the severity of the operating conditions. It is preferred that at least 15 volume percent and, more preferably, at least 20 volume percent of the oil is converted to liquid products boiling at or below 700° F. in a single pass; however, the maximum conversion is usually less than 50 volume percent and often less than 45 volume percent. It is highly preferred that about 15 to about 35 volume percent of the oil is converted, in a single pass, to liquid products boiling at or below 700° F., and that at least about 85 volume percent of the 700° F. minus fraction contain liquid hydrocarbon products boiling in the mid-barrel range from about 300° F. to about 700° F.

The invention is further illustrated by the following examples which are illustrative of specific modes of practicing the invention and are not intended as limiting the scope of the invention defined by the appended claims.

EXAMPLE I

Two catalysts are prepared in accordance with the invention. The first catalyst, Catalyst A, is prepared by extruding a gamma alumina-containing material through a die. The extruded matter, having a cross-sectional shape of a three leaf clover, is broken into particulates and dried at 930° F. Support particulates, having a nominal 1/20 inch cross-sectional width (measured by maximum distance across two such clover leaves), are then impregnated with nickel nitrate hexahydrate and ammonium heptamolybdate dissolved in phosphoric acid so as to incorporate into the catalyst, after drying and a calcination, about 4 weight percent nickel components, calculated as NiO, about 25 weight percent molybdenum components, calculated as $MoO_3$, and about 3 weight percent of phosphorus components, calculated as P.

The second catalyst, Catalyst B, is prepared in the same manner as Catalyst A. Catalyst B has the same weight percentages of nickel, molybdenum and phosphorus components as Catalyst A; however a different gamma alumina support is utilized. The porosity characteristics of Catalysts A and B are shown in Table II as follows:

TABLE II

| Pore Diameter Angstroms | Catalyst A % Pore Volume | Catalyst B % Pore Volume |
| --- | --- | --- |
| <60 | — | 5.9% |
| 60–65 | — | 4.9% |
| <65 | 5.7% | — |
| 65–70 | 3.2% | 4.9% |

TABLE II-continued

| Pore Diameter Angstroms | Catalyst A % Pore Volume | Catalyst B % Pore Volume |
| --- | --- | --- |
| 70–80 | 12.1% | 20.6% |
| 80–90 | 37.1% | 30.3% |
| 90–100 | 32.7% | 18.0% |
| 100–105 | 2.4% | 3.0% |
| >105 | 6.8% | 11.0% |
| PORE VOLUME cc/gram (Merc. Poros.) | 0.33 | 0.34 |
| MODE PORE DIAMETER (Merc. Poros.) | ~87 | ~83 |

Both catalysts are tested for their activity for mild hydrocracking the hydrocarbon feedstock identified in the following Table III.

TABLE III

| Feedstock Properties | |
| --- | --- |
| Feed Description | Light Arabian Vacuum Gas Oil |
| Gravity, °API | 22.3 |
| Sulfur, wt. % | 2.54 |
| Nitrogen, wt. % | 0.09 |
| Carbon Residue, D-189, wt. % | 0.42 |
| Pour Point, °F. | +95 |
| ASTM D-1160, Vol. % | Distillation, °F. |
| IBP/5 | 623/700 |
| 10/20 | 737/776 |
| 30/40 | 810/837 |
| 50/60 | 860/898 |
| 70/80 | 928/968 |
| 90/95 | 1019/1056 |
| EP/% rec | 1103 |

The test is conducted by contacting the catalysts in separate runs with the feedstock identified in Table III under mild hydrocracking conditions. However, at the outset of each run, the respective catalysts are presulfided by contact for about 16 to 20 hours with a gas consisting of 90 volume percent H and 10 volume percent $H_2S$ flowing at 4.4 SCFM (one atmosphere pressure). The temperature during the presulfiding is initially at room temperature, is increased gradually until 700° F. is reached, and then lowered to 550° F., at which time the catalyst is contacted with the feedstock.

A portion of the feedstock is passed downwardly through a reactor vessel and contacted in separate runs with Catalysts A, B and a commercial mild hydrocracking catalyst in a single-stage, single-pass system with once-through hydrogen. The operating conditions during each run are summarized as follows: 1,000 p.s.i.g. total pressure, 1.0 LHSV, a hydrogen rate of 3,000 SCF/bbl, and temperature adjusted to determine the conversions obtainable at 710°, 735°, and 755° F. The sulfur, nitrogen and mild hydrocra conversions obtained for each catalyst are set forth in the following Table IV, with it being noted that mild hydrocracking conversion is calculated as the volume percentage of material boiling above 700° F. converted to material boiling at or below 700° F.

TABLE IV

| | Conversion to 700° F.- at Temp. °F. | | | Wt. % Sulfur at Temp. °F. | | | Wt. % Nitrogen at Temp. °F. | | |
| --- | --- | --- | --- | --- | --- | --- | --- | --- | --- |
| | 710 | 735 | 755 | 710 | 735 | 755 | 710 | 735 | 755 |
| Commercial Catalyst | 18.0 | 22.6 | 29.6 | — | 0.23 | 0.113 | 0.040 | 0.024 | 0.015 |
| Catalyst A | 21.9 | 31.5 | 34.2 | 0.044 | 0.0056 | 0.0032 | 0.005 | 0.002 | 0.001 |

TABLE IV-continued

| | Conversion to 700° F.- at Temp. °F. | | | Wt. % Sulfur at Temp. °F. | | | Wt. % Nitrogen at Temp. °F. | | |
|---|---|---|---|---|---|---|---|---|---|
| | 710 | 735 | 755 | 710 | 735 | 755 | 710 | 735 | 755 |
| Catalyst B | 22.9 | 30.3 | 38.0 | 0.034 | 0.009 | 0.005 | 0.005 | 0.002 | 0.001 |

The data in Table IV clearly indicate that both Catalysts A and B are useful for mild hydrocracking a typical gas oil feedstock. In addition, the data obtained at 735° F. and 755° F. evidence the superiority of the processes using Catalysts A and B over that of the commercial catalyst. Based on the data in Table IV, the catalyst of the invention is markedly superior to the commercial catalyst for converting the feed to 700° F.- products and in its activity for desulfurization and denitrogenation.

Although the invention has been described in conjunction with its preferred embodiment and examples, many variations, modifications, and alternatives will be apparent to those skilled in the art. For example, although the foregoing catalysts were described in relation to their particular usefulness for mild hydrocracking, it is clear from the discoveries in the present invention that such catalysts may also be used for hydrocracking, either alone or in conjunction with conventional small pore hydrocracking catalysts (i.e. catalysts containing zeolitic and/or nonzeolitic molecular sieves having pore sizes having diameters less than about 20 angstroms). Accordingly, it is intended to embrace within the invention all such variations, modifications, and alternatives as fall within the spirit and scope of the appended claims.

I Claim:

1. A process for simultaneously hydrodesulfurizing, hydrodenitrogenating and mild hydrocracking a hydrocarbon feedstock comprisng contacting said feedstock containing nitrogen components, sulfur components and feed components boiling above 700° F. with a particulate catalyst comprising at least one active nickel hydrogeneation metal component, at least one active molybdenum hydrogenation metal component and at least one phosphorus component on an amorphous porous refractory oxide, said catalyst having a pore size distribution wherein at least 75 percent of the pore volume is in pores of diameter in the range from about 50 angstroms to about 130 angstroms and less than 10 percent of said pore volume is in pores of diameter greater than 110 angstroms, under conditions such that said sulfur coomponents and said nitrogen components in said feedstock are converted to product components of reduced sulfur and nitrogen content and about 10 to about 50 volume percent of said feed components boiling above 700° F. are simultaneously converted to product components boiling at or below 700° F.

2. The process defined in claim 1 wherein said conditions include a hydrogen partial pressure less than about 1,500 p.s.i.g.

3. The process defined in claim 1 wherein said catalyst has a mode pore diameter is in the range from about 55 to about 100 angstroms.

4. The process defined in claim 3 wherein said mode pore diameter is in the range from about 60 to about 90 angstroms.

5. The process defined in claim 1 wherein said amorphous porous refractory oxide comprises a member selected from the group consisting of silica, alumina, silica-alumina, magnesia, silica-magnesia, zirconia, silica-zirconia, titania, silica-titania, and silica-zirconia-titania.

6. The process defined in claim 1 wherein said conditions yield at least about 20 volume percent conversion of said feed components boiling above 700° F. to product components boiling at or below 700° F.

7. The process defined in claim 1 wherein said catalyst contains up to about 10 weight percent of said nickel hydrogenation metal, calculated as NiO.

8. The process defined in claim 1 wherein said catalyst contains up to about 30 weight percent of molybdenum metal hydrogenation component, calculated as $MoO_3$.

9. The process defined in claim 1 wherein said catalyst contains about 1 to about 6 weight percent of phosphorus components, calculated as P.

10. The process in claim 3 wherein said catalyst has a least 75 percent of the pore volume in pores of diameter from about 20 angtroms above the mode pore diameter to about 20 angstroms below said mode pore diameter.

11. A process for simultaneously hydrodesulfurizing, hydrodenitrogenating and mild hydrocracking a hydrocarbon feedstock comprising nitrogen components, sulfur components and feed components boiling above 700° F. comprising contacting said feedstock under conditions of elevated temperature and a hydrogen partial pressure less than about 1,500 p.s.i.g. with a particulate catalyst comprising at least one nickel active metal hydrogenation component, at least one molybdenum active metal hydrogenation component and at least one phosphorus component on a support comprising an amorphous porous refractory oxide, said catalyst having a pore size distribution wherein the mode pore diameter is in the range from about 55 to about 100 angstroms and at least about 75 percent of the pore volume is in pores of diameter in the range from about 50 angstroms to about 130 angstroms and from about 20 angstroms above the mode pore diameter to about 20 angstroms below said mode pore diameter and less than 10 perecent of said pore volume is in pores of diameter greater than 110 angstroms, said conditions are such that said sulfur components and said nitrogen components in said feedstock are converted to product components of reduced sulfur and nitrogen content and between about 10 and 50 volume percent of the feed components boiling above 700° F. are simultaneously converted to product components boiling at or below 700° F.

12. The process defined in claim 11 wherein said amorphous porus refractory oxide comprises a member selected from the group consisiting of silica, alumina, silica-alumina, magnesia, silica-magnesia, zirconia, silica-zirconia, titania, silica-titania, and silica-zirconia-titania.

13. The process defined in claim 11 wherein said mode pore diameter is in the range from about 60 to about 90 angstroms.

14. The process defined in claim 11 wherein said catalyst contains about 17 to about 35 weight percent of said molybdenum components, calculated as MoO₃ and about 2 to about 6 weight percent of said nickel components, calculated as NiO.

15. The process defined in claim 11 wherein said conditions yield at least about 20 volume percent conversion of the feed components boiling above 700° F. to product components boiling at or below 700° F.

16. A process for simultaneously hydrodesulfurizing, hydrodenitrogenating and mild hydrocracking a hydrocarbon feedstock selected from the group consisting of a gas oil or residuum containing nitrogen components, sulfur components and a substantial proportion of feed components boiling below about 1100° F. with at least some of said feed components boiling above 700° F., under conditions of elevated temperature and a hydrogen partial pressure less than about 1,500 p.s.i.g. with a catalyst consisting essentially of about 2 to about 6 weight percent of at least one nickel metal hydrogenation component, calculated as NiO, and about 17 to about 27 weight percent of at least one molybdenum metal hydrogenation component, calculated as MoO₃ and about 1 to about 6 weight percent of at least one phosphorus component, calculated as P, on a support comprising gamma alumina, said catalyst having a pore size distribution wherein the mode pore diameter is in the range from about 60 to about 90 angstroms and at least about 75 percent of the pore volume is in pores of diameter in the range from about 50 angstroms to about 130 angstroms and from about 20 angstroms above the mode pore diameter to about 20 angstroms below said mode pore diameter and less than 10 perecent of said pore volume is in pores of diameter greater than 110 angstroms, said conditions being such that said sulfur components and said-nitrogen components in said feedstock are converted to product components of reduced sulfur and nitrogen content and between about 10 and 50 percent by volume of said feed components boiling above 700° F. are simultaneously converted to product components boiling at or less than 700° F.

17. The process as defined in claim 16 wherein between about 15 and 35 percent by volume of said feed components boiling above 700° F. are converted to product components boiling at or below 700° F.

18. The process defined in claim 16 wherein said catalyst has at least 80 percent of said pore volume in pores of diameter from about 20 angstroms above the mode pore diameter to about 20 angstroms below said mode pore diameter.

19. The process defined in claim 16 wherein said catalyst has less than 15 percent of said pore volume in pores of diameter greater than 90 angstroms.

20. The process defined in claim 16 wherein said catalyst has less than 10 percent of said pore volume in pores of diameter less than 50 angstroms.

* * * * *